April 18, 1933.  J. B. DES ROSIERS  1,904,359
CONTROLLING MEANS FOR VEHICLE WHEEL BRAKES
Filed May 2, 1928  2 Sheets-Sheet 2

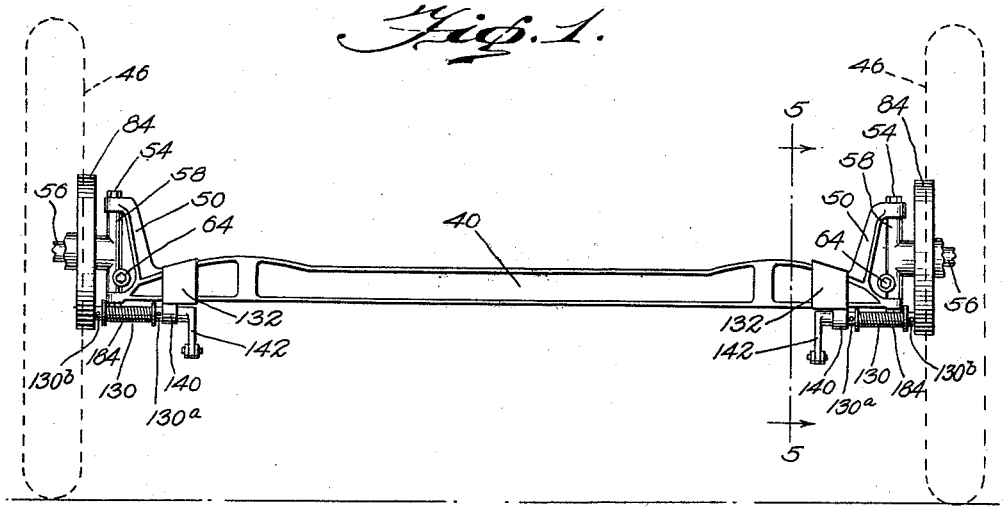
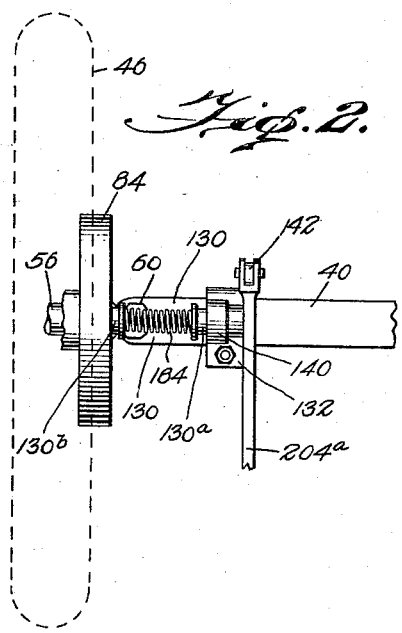
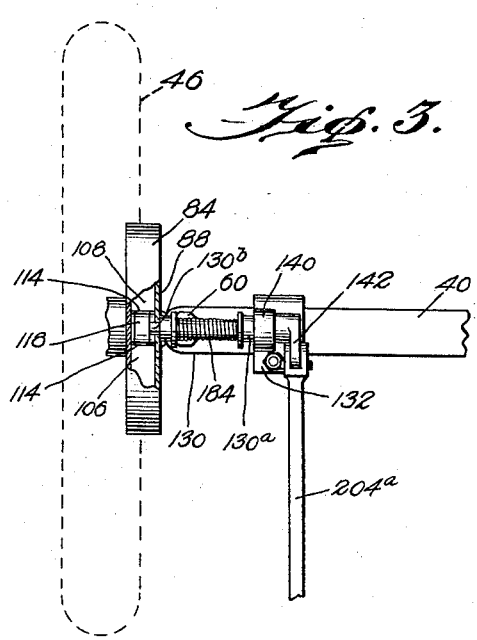

Inventor
JOHN B. DESROSIERS
By Thomas A. Jenkes Jr.
Attorney

Patented Apr. 18, 1933

1,904,359

UNITED STATES PATENT OFFICE

JOHN B. DES ROSIERS, OF PROVIDENCE, RHODE ISLAND

CONTROLLING MEANS FOR VEHICLE WHEEL BRAKES

Application filed May 2, 1928. Serial No. 274,609.

My invention relates to controlling means for vehicle front wheel brakes.

Vehicle wheel brakes no matter whether they be of the expansion or contraction type require some means to apply either by contraction or expansion the brake band to the brake drum. This becomes a rather difficult problem for front wheels which have to rotate freely around a substantially horizontal axis and swivel around a substantially vertical axis. Rotatable means attached to the vehicle preferably substantially parallel to the front axle which in motor vehicles is usually stationary is normally provided to move the brake band to contact the brake drum. These rotatable rods in front wheel brakes of the mechanical type are usually attached to either the axle or the frame in a vertical plane with the axis of the axle and are usually provided with some type of universal joint, the swivelling point thereof usually being on a line with the swivelling point of the vertical spindle so that as the front wheels swivel, the portion of the rotatable means nearest the brake will theoretically swivel about the vertical spindle without changing its radius. As the spindle yoke and vertical spindle are normally of a height corresponding to the desirable diameter of a brake drum, it has been almost impossible to attach this type of controlling mechanism in this fashion without thoroughly re-designing the whole axle or wheel. Even theoretically correct controlling means such as hitherto described have not functioned perfectly due to the relative play between the axle or frame and wheel, the fact that the parts wear so as not to revolve on a theoretically unchanging radius and the friction present in former joints of this type. The chief object of my invention is to provide an improved mechanical controlling means for applying front wheel brakes.

This application relates to the subject matter of my patent application Serial No. 39,296—controlling mechanism for front wheel brakes, filed June 24, 1925.

I have found that the reason why former brakes have not functioned successfully is that no one has hitherto designed a satisfactory joint sufficiently freely expansible and flexible in all directions. I am aware that expansible joints comprising sliding bearings have been designed for this purpose but so far as I am aware none of these have gone into practical use due to the friction between the parts of the bearing. A further object of my invention therefore is to provide a freely expansible joint for the rotatable means used for this purpose which may freely expand or contract with a minimum amount of friction to permit swivelling of the front wheels.

A further object of my invention, therefore, is to provide controlling means for front wheel brakes which may be freely rotated to apply the brakes and at the same time due to the practical absence of friction will permit the front wheels to be readily turned as usual.

A further object of my invention is to provide such a freely expansible and flexible rotatable controlling means that each front brake is applied with equal force, no matter what the angle of swivelling thereof may be. This latter advantage has been the chief argument for the use of fluid pressure actuated front wheel brakes.

A further object of my invention is to provide a rotatable controlling means for front wheel brakes which as it is freely expansible axially may function no matter at what point it is attached to the brake disk. I thus provide a construction which may be readily attached to existing automobiles without redesigning the front wheel axles thereof and a construction which will function more perfectly than any hitherto constructed even if attached axially in line vertically with the axle.

A further object of my invention is to provide in sub-combination a rotatable means which is freely expansible and freely flexible in all directions no matter where or how employed.

These and such other objects of my invention as may hereinafter appear will be best understood from a description of the embodiments thereof shown in the accompanying drawings applied to a Model T Ford automobile.

In the drawings, Fig. 1 is a front elevation of the front axle of an automobile having the front wheels swivelled thereon and with my invention attached thereto, the wheels being swivelled to move directly forward.

Fig. 2 is a reverse plan view of the right front wheel of the automobile shown in Fig. 1 with the brake off.

Fig. 3 is a reverse plan view similar to Fig. 2 with the rotatable rod rotated and the helical spring rotated and compressed to apply the brake.

Figure 4:
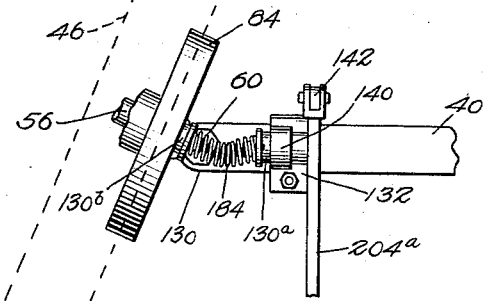
Fig. 4 is a reverse plan view similar to Fig. 2 with the wheel swivelled to the left to turn the car to the left.
Figure 5:
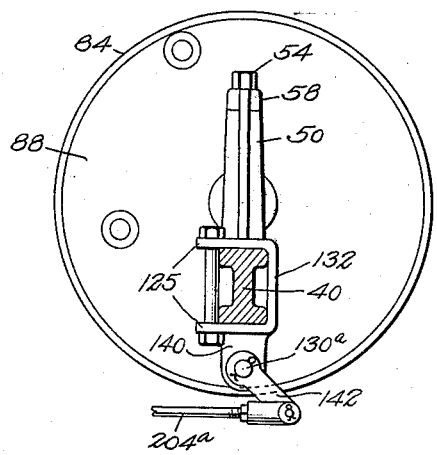
Fig. 5 is a sectional view through the axle on line 5—5 of Fig. 1 with the brake off.
Figure 6:
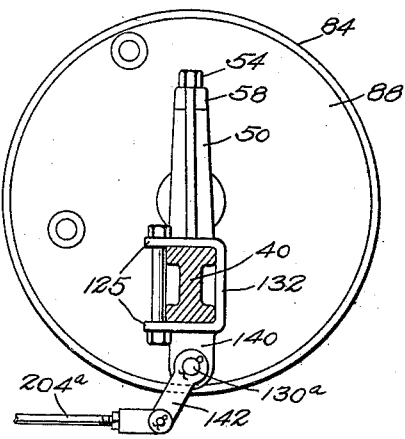
Fig. 6 is a sectional view similar to Fig. 5 with the brake applied.

In the drawings, wherein like characters of reference indicate like parts throughout, 40 generally indicates the front axle of an automobile. The front wheels 46 are mounted on the ends of said front axle 40 so as to rotate freely about a substantially horizontal axis. The front wheels 46 are mounted in the usual manner to swivel around a substantially vertical axis on the ends of the front axle 40. For this purpose the front axle 40 is provided at each end thereof with the vertical spindle yoke 50 having the usual vertical holes in the ends thereof to receive the vertical spindle 54. Each axle spindle 56 is provided with the usual integral vertical spindle body casing 58 at the inner end thereof. Said casing is adapted to be contained between the ends of the vertical spindle yoke 50, the usual vertical spindle 54 being inserted through the holes in the ends of the spindle yoke 50, and the vertical spindle body casing 58 and thereby secured to said yoke by the usual vertical spindle nut 60. It is obvious that the axle spindle 56 and integral spindle body casing 58 are adapted to swivel on the vertical spindle 54. The usual steering rods are attached as usual to the holes 64 in the sides of the spindle body casing.

I have provided a front wheel braking mechanism similar in general construction to the rear wheel braking mechanism, the front wheel braking mechanism being of the expansion type commonly employed on Fords and most other types of automobiles, which braking mechanism is explained in detail in my patent application Serial No. 39,296. The inner end of the spindle 56 adjacent to the vertical spindle body casing 58 is provided with a radially spread out brake flange 88 extending to a diameter slightly less than the cooperating hub brake drum 84. This brake flange 88 is preferably cast integral with the axle spindle 56 and vertical spindle body casing 58.

The braking means comprises the usual two semi-circular shoe sections 106 and 108 pivotally secured together and having flattened ends 114 movable outwardly to expand said brake shoe sections against the pressure of suitable springs. The preferably oval shaped cams 118 are provided which may be revolved so that their largest diameter contacts the flattened ends 114 of the shoe sections 106 and 108 to expand said sections against the brake drum flange 84 and which may be revolved so that when their smallest diameter contacts the flattened ends 114 of the brake shoe sections the springs will pivotally contact such sections 106 and 108 to withdraw them away from the brake drum flange 84. The cams 118 have been revolved hitherto in many fashions and my invention comprises in combination therewith means freely flexible and freely expansible to revolve said cams to apply the brakes.

As explained, the cams 118 are usually revolved by some type of means actuated from the driver's seat. To apply the brakes in most types of mechanical front wheel brakes and in my invention these cams 118 are preferably revolved by rods or other rotatable means preferably mounted on the vehicle either on the axle or on the frame in a transverse horizontal axis parallel to that of the front axle. In the preferred embodiment shown, however, I preferably mount said rods substantially underneath the axle and substantially under the swivelling axis of the spindle 54 and hence wheel. In the preferred embodiment of my invention shown the rotatable means 130 are preferably mounted on brackets 132 attached to the front axle adjacent to each end thereof. The brackets 132 may be cast integral with the front axle 40 or may comprise, as shown, detachable members having the arms 125 for embracing the front axle and the extensions comprising the collars 140 parallel to the front axle 40 in which the rotatable means 130 may be revolvably mounted. In my preferred embodiment I break this rotatable means 130 into two rod or shaft sections 130$^a$ and 130$^b$, the section 130$^a$ being the main rod section and adapted to revolve within the collar 140 against longitudinal movement thereon and the section 130$^b$ having the cam 118 attached to the outer end thereof, the cam 118 functioning as explained to actuate the braking mechanism and the rod or shaft section 130$^b$ with its attached cam 118 comprising the actuating means for each braking mechanism mounted on each wheel to swivel therewith. The shaft 130$^b$ is thus a swivelling shaft or rod section and the shaft 130$^a$ is thus a non-swivelling shaft or rod section. I connect these rod sections by connecting means which is not only freely axially expansible and freely flexible, but also rotatable to revolve the cams 118 to apply the brakes. Broadly, my invention covers the combination of a stationary axle, a wheel mounted on each end of said axle so as to rotate freely around a substantially horizontal axis and swivel around a substantially vertical axis, a braking mechanism attached to each wheel and means operable from the driver's seat to actuate said braking mechanism, said means including expansion joints to compensate for swivelling of the wheels and to permit relative movement between said axle and wheel or frame and wheels, and I broadly claim the combination of any suitable means for this purpose as I have shown the first means suitable for this purpose in my application Serial No. 39,296 aforesaid. This application is specifically directed to a specific type of means for this purpose shown and described but not specifically claimed therein, the other embodiments shown in said application being specifically claimed therein.

Figure 7:
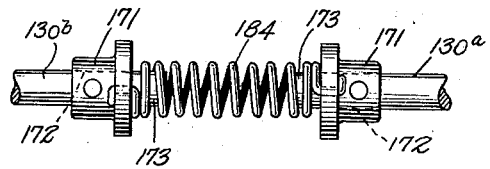
Fig. 7 is a side elevation of the helical spring means I employ for connecting the rod sections of the rotatable controlling means, said means comprising an expansible flexible yet rotatable spring.

As stated, my invention broadly includes a connection axially expansible, flexible and yet rotatable. Fig. 7 shows an embodiment of spring means which may be employed for this purpose. The rod sections 130$^a$ and 130$^b$ are provided with the usual connecting socket members 171 having the usual sockets 172 to receive the adjacent ends of the rod sections 130$^a$ and 130$^b$ therein. A helical spring 184 is suitably mounted between said socket members 171, preferably being sleeved on the nubs 173 projecting inwardly of said socket members 171 and having its ends secured thereto. It is thus obvious that the helical spring 184 permits the swivelling of the wheel and serves, as shown in Fig. 4, as a torque transmitting element between said sections in all positions of the wheel.

The rotatable means 130 are, as explained, revolvably mounted in the collars 140 projecting from the front axle 40. To rotate said rotatable means 130 to apply the braking mechanisms some type of means operable from the driver's seat is necessary. I provide the rods 204$^a$ suitably actuated through the medium of the usual controller shaft, (not shown) preferably in the manner described in my said application Serial No. 39,296 aforesaid for revolving the rotatable brake actuating means 130 of the front and rear brakes respectively. The rods 204$^a$ have the front ends thereof pivotally attached to the arms 142 projecting from said rotatable rods 130$^a$ of the front wheels. I employ the word "rod", "rod sections", "shaft", or "shaft sections" to include any members that may be rotated flexible or otherwise.

In the drawings for purposes of illustration, I have slightly exaggerated the action of the helical springs 184 which I preferably employ.

Fig. 2, as stated, is a reverse plan view of my preferred form of braking mechanism with the wheels directed straight ahead and the brakes off.

Fig. 3 is a similar view with the rod 204$^a$ pulled backwards to rotate the rod section 130$^a$ to rotate the spring 184 to rotate the braking mechanism actuating means, comprising the rod 130$^b$ and its integral cam 118 to expand the brake shoe sections 106 and 108 to apply the brakes. I preferably employ a relatively stiff helical spring, which, when the shaft section 130$^a$ is rocked, will tighten its coils to apply the brake. It is thus apparent that as shown in Fig. 1 the direction of the springs 184 is reversed on the right and left front wheels so that when the shafts 204$^a$ are rotated in a manner to apply the brakes, the coils of each individual spring 184 will be suitably tightened to apply the brakes. As shown in Fig. 4, the outer end of each spring 184 is attached to the inner end of the rod section 130$^b$ approximately at the swivelling axis of the wheel. It is thus obvious that the spring 184 consists of a joint permitting swivelling of the wheel which is movable substantially at right angles to the swivelling axis to an active position substantially in that axis as shown in Fig. 3. As shown in Fig. 4, it is obvious that the rotatable means 130 is freely expansible and freely flexible in all directions to permit a swivelling of the wheel without any impairment of its braking ability.

It is understood that my invention is not limited to the specific embodiments shown and that various deviations may be made therefrom without departing from the spirit and scope of the appended claims.

What I claim is:

1. Brake-operating mechanism for a brake on a swivelled wheel comprising, in combination, swivelling and non-swivelling shaft sections approximately in alinement with each other when the wheel is directed straight ahead and a spring connecting said sections approximately at the swivelling axis of the wheel and permitting the swivelling of the wheel and serving as a torque-transmitting element between said sections in all positions of the wheel.

2. Brake-operating mechanism for a brake on a swivelled wheel comprising, in combination, swivelling and non-swivelling shaft sections approximately in alinement with each other when the wheel is directed straight ahead, and a helical torque-transmitting element sleeved on the adjacent ends of said sections approximately at the swivelling axis of the wheel and connecting said sections and permitting the swivelling of the wheel.

3. Operating mechanism for a brake on a swivelled wheel comprising, in combination, swivelling and non-swivelling shaft sections, and a helical torsion element sleeved on the adjacent ends of the sections and secured at its ends to said sections respectively approximately at the swivelling axis of the wheel.

4. In a road vehicle, the combination of a stationary axle, a wheel mounted on each end of said axle so as to rotate freely around a horizontal axis and to swivel around a substantially vertical axis, a braking mechanism attached to each wheel, an actuating means for each braking mechanism mounted on each wheel to swivel therewith, a rotatable rod for each wheel, non-swivelly mounted on said axle against longitudinal movement thereon and parallel therewith, springs freely movable axially of the axle and freely flexible in all directions, connected to said rotatable rods, and adapted to actuate said braking mechanism actuating means and means operable from the driver's seat to rotate said rods to actuate said braking mechanisms.

5. In a road vehicle, the combination of a stationary axle, a wheel mounted on each end of said axle so as to rotate freely around a horizontal axis and to swivel around a substantially vertical axis, a braking mechanism attached to each wheel, an actuating means for each braking mechanism mounted on each wheel to swivel therewith, rotatable rod for each wheel, non-swivelly mounted on said axle against longitudinal movement thereon and parallel therewith, helical springs connected to said rods and adapted to actuate said brake mechanism actuating means freely movable axially of the axle and freely flexible in all directions to permit a swivelling movement between said rods and the braking mechanism actuating means and capable of translating a rotatable movement of the rods into a substantially equal movement of the braking mechanism actuating means to apply said braking mechanisms with substantially equal pressure at any angle of swivelling thereof and to maintain said braking pressures on said wheels during the swivelling thereof, and means operable from the driver's seat to rotate said rods to actuate said braking mechanisms.

6. A vehicle having a front wheel with a brake and comprising in combination therewith, a shaft formed of a helically wound spring arranged at its outer end to apply the brake, a support for the inner end of the shaft, and means for rocking the shaft to apply the brake.

In testimony whereof I affix my signature.

JOHN B. DES ROSIERS.